United States Patent [19]

Chough et al.

[11] 3,809,050

[45] May 7, 1974

[54] MOUNTING BLOCK FOR SEMICONDUCTOR WAFERS

[75] Inventors: Euiwon Chough; Frank T. Deverse, both of Wappingers Falls; Franz Konrad; John A. Kurtz, both of Hopewell Junction; Russell C. Manchester, Beacon, all of N.Y.

[73] Assignee: Cogar Corporation, Wappingers Falls, N.Y.

[22] Filed: Jan. 13, 1971

[21] Appl. No.: 106,143

[52] U.S. Cl. .................... 125/35, 51/216 R, 51/235, 269/21

[51] Int. Cl. .............................................. B28d 7/04

[58] Field of Search ............ 125/12, 13, 35; 51/216, 51/235; 269/21

[56] References Cited

UNITED STATES PATENTS

| | | | |
|---|---|---|---|
| 477,303 | 6/1892 | Morsh | 51/235 |
| 2,431,282 | 11/1947 | Speed | 125/35 |
| 2,414,574 | 1/1947 | Williams | 51/235 X |
| 3,131,476 | 5/1964 | Seher | 51/235 X |
| 2,868,072 | 1/1959 | Weiskopf | 51/216 A X |

FOREIGN PATENTS OR APPLICATIONS

| | | | |
|---|---|---|---|
| 97,121 | 8/1961 | Denmark | 125/13 |

*Primary Examiner*—Harold D. Whitehead
*Attorney, Agent, or Firm*—Harry M. Weiss; Joseph L. Spiegel

[57] ABSTRACT

A mounting block carries a processed semiconductive wafer through subsequent steps, i.e., dicing, cleaning, testing and chip selection. The mounting block has a raised circular central portion to which the wafer is bonded by means of an adhesive. The central portion contains a plurality of apertures, each corresponding to and to be in registry with a device in the wafer to be mounted thereon. The apertures enable the wafer to be secured to the block without touching the device surface, by applying a vacuum to the backside. The apertures also permit later removal of only acceptable chips from the mounting block without loss of orientation. The central portion is also slotted to permit wafer to be diced without the blades touching the block surface or adhesive, whereby the block may be repeatedly reused and the blade has longer life. A lower circuit flange on the block is provided with a notch and flats, for alignment purposes using apparatus for mounting the wafer in precise alignment including a microscope. The mounting block is also supported in one of several saws.

2 Claims, 15 Drawing Figures

INVENTORS
EUIWON CHOUGH
FRANK T. DEVERSE
FRANZ J. KONRAD
JOHN A. KURTZ
RUSSELL C. MANCHESTER

BY Joseph L. Spiegel
Harry M. Weiss
ATTORNEYS

MOUNTING BLOCK FOR SEMICONDUCTOR WAFERS

BACKGROUND OF THE INVENTION

1. Field of the Invention

This invention relates to the manufacture of integrated circuit modules using active devices formed in semiconductive wafers, and is concerned with that portion of the manufacturing cycle from the time that processing of the semiconductive wafer is completed, but before the semiconductive dice or chips have been mounted on a substrate.

2. Description of the Prior Art

The manufacture of integrated circuit modules involves: processing semiconductive wafers, that is, a series of oxidation, etching, diffusion and metallization steps to form a plurality of semiconductive devices within the wafer; testing the devices; subdividing the wafers into semiconductive dice; joining the dice to a substrate; packaging same to form a module; and, subjecting the modules to a final testing.

Heretofore, after the wafer had been processed but before the wafer was subdivided and joined to a substrate, the wafer was bonded to the flat surface of a mounting block by means of a heat sensitive glue. The wafer was then placed in a cutting apparatus, typically a slurry saw, and subdivided to form a plurality of dice. The glue was then dissolved to release the dice from the mounting block. The interaction between the mounting block and cutting mechanism resulted in the block being discarded and in shortened life for the saw employed.

The dice released from the mounting block were collected, placed in orientation equipment that normally included a syntron bowl and tested with the acceptable dice being sorted out from the unacceptable dice on the basis of the test results. These prior art techniques were both time consuming and expensive.

SUMMARY OF THE INVENTION

Accordingly, an object of the invention is improved processing of semiconductive wafers using an improved mounting block for each wafer.

Another object is a reusable mounting block for use in processing semiconductive wafers.

Still another object is precise alignment of a semiconductive wafer on said mounting block including alignment means on the block for the desired accurate alignment of the wafer.

A further object is to minimize damage to a semiconductive wafer during the dicing operation because of the surface configuration of the mounting block supporting the wafer.

A still further object is longer dicing blade life which is permitted by the slotted surface configuration of the mounting block used to support a semiconductor wafer that is to be cut by said dicing block.

Another object is an improved dicing saw with a diamond cutting surface especially useful in cutting a semiconductor wafer located on a mounting block.

Still another object is an improved dicing saw with a titanium carbide cutting surface especially useful in cutting a semiconductor wafer located on a mounting block.

These and other objects are accomplished in accordance with the teachings of the present invention, one illustrative embodiment of which comprises adhering the wafer to a mounting block of special design which will carry the wafer through subsequent processing steps, i.e., dicing, cleaning and testing and chip selection. The block has a raised circular central portion and a lower flange. The central portion is apertured with each aperture corresponding to and to be in registry with the dice to be mounted thereon. The central portion is also slotted in spaced rows and columns. The lower flange is generally circular and is provided with a notch and flats for orientation purposes.

After an adhesive is applied to the top surface of the mounting block, the wafer is precisely mounted thereon. Apparatus for accomplishing same comprises: a wafer holder for receiving and holding a wafer; a placement mechanism for receiving and holding the mounting block beneath the wafer holder; a mechanical stage for displacing the wafer holder relative to the placement mechanism when the mounting block is positioned beneath the wafer holder; an alignment means including a split field microscope and an alignment reticle to permit an operator to achieve precise alignment between the wafer when being held by the wafer holder, and the mounting block when positioned on the placement mechanism between the wafer holder; and, means for causing relative movement between the wafer holder and placement mechanism whereby the wafer may be placed on the mounting block. Pneumatic means are also provided for controlling acceptance and release of the wafer from the wafer holder and for controlling movement of the placement mechanism.

The wafer may be subdivided using a slurry saw, a diamond saw or a titanium carbide saw. When using the slurry saw, preferably a protective polymer coating is applied to the surface of the wafer prior to the dicing operation. The diamond saw comprises a stainless steel disc with diamond particles from 8 to 12 microns in size about the periphery of the disc. A titanium saw comprises a stainless steel disc with a coating of sputtered titanium carbide 1,000 A units to 1.0 mil thick about the periphery of the disc. In the cutting position the saw is aligned with the rows and columns in the mounting block. As the cutting action advances along a given row or column, the saw never comes in contact with the surface of the mounting block or adhesive, yielding longer life for the saw and permitting the mounting block to be reused repeatedly.

DESCRIPTION OF THE DRAWING

The foregoing and other objects, features and advantages of the invention will be apparent from the following more particular description of the preferred embodiments of the invention as illustrated in the accompanying drawing, wherein.

DESCRIPTION OF THE PREFERRED EMBODIMENTS

The manufacture of integrated circuit modules involves: processing semiconductive wafers, that is, a series of oxidation, etching, diffusion and metallization steps, to form a plurality of semiconductive devices within the wafer; testing the devices; subdividing the wafers into semiconductive dice; joining the dice to a substrate; packaging same to form a module; and, subjecting the modules to final test.

The present invention is concerned with that portion of the manufacturing cycle from the time that processing of the semiconductive wafer is completed, but before the semiconductive dice or chips have been mounted on the substrates.

Figure 1:
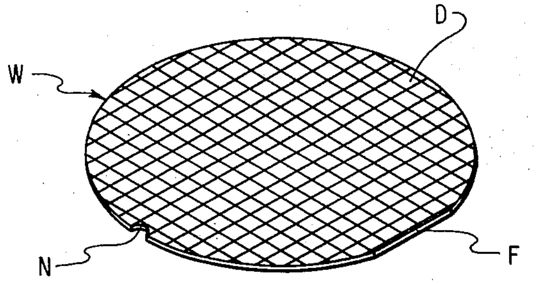
FIG. 1 is a perspective view of the active portion of a processed semiconductive wafer.

Referring now to FIG. 1 of the drawing there is illustrated a semiconductive wafer W. The wafer is cut at two points along its periphery to form a notch N and flat F for orientation and crystallographic identification purposes. It is assumed, for the purposes of our explanation, that the wafer W has been subjected to a series of oxidation, photolithographic masking and etching, diffusion, passivation and metallization steps to form a plurality of semiconductive devices within the wafer W and that the wafer is now ready to be subdivided into a plurality of dice or chips D, tested and ultimately mounted on substrates.

WAFER MOUNTING BLOCK

In accordance with one aspect of our invention, the wafer W is adhered to a mounting block of special design which will carry the wafer W through subsequent processing steps, i. e., dicing, cleaning, testing and chip selection.

Figure 2:
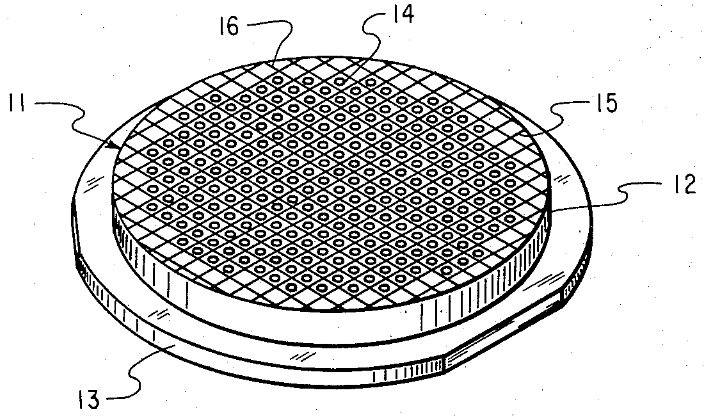
FIG. 2 is a perspective view of the top portion of a mounting block for semiconductive wafers.
Figure 3:
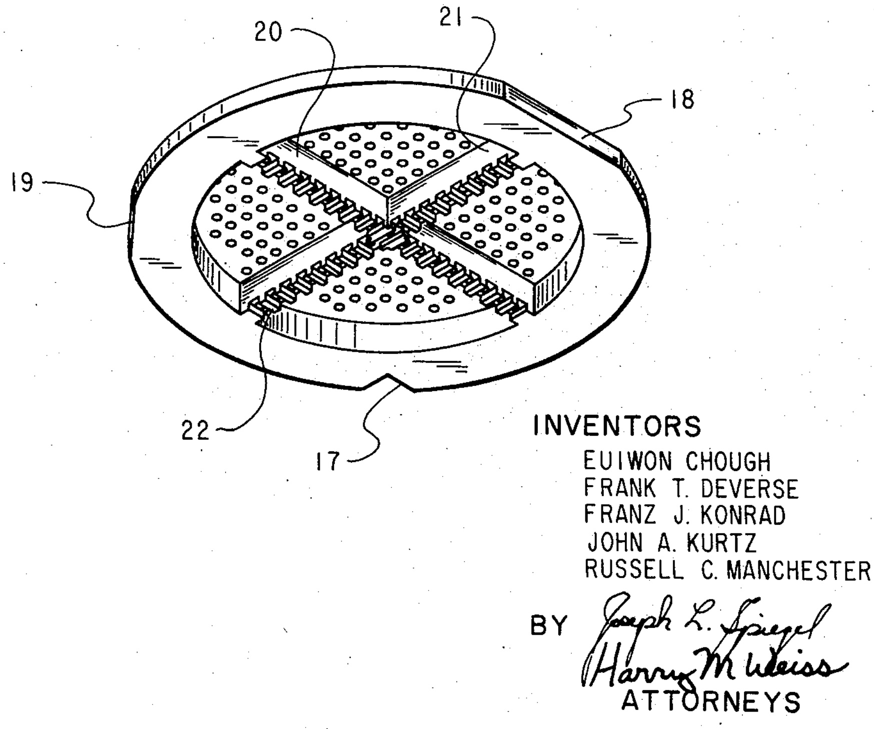
FIG. 3 is a perspective view of the bottom portion of the mounting block of FIG. 2.

Referring in particular to FIGS. 2 and 3 of the drawing, the mounting block 11 as of plastic is shown as having a raised, top, circular central portion 12 and a lower flange 13.

The central portion contains a plurality of apertures 14 having a diameter on the order of one-half to three-quarters the size of the chips D, each aperture corresponding to and to be in registry with a device D in the wafer W to be mounted thereon.

These holes, as will be apparent from the ensuing discussion, will enable a wafer to be secured to the block through application of a vacuum to the backside of the block, and without touching the device surface of the wafer. In addition, after testing and dicing, the holes will facilitate removal of acceptable chips from the block 11 and without loss of orientation.

The central portion is also slotted in rows and columns at 15, 16, respectively, to a width on the order of 0.020 inch and a depth on the order of 0.015 inch, depending on chip size. The slots in the rows and columns are spaced 0.130 inch apart, depending on chip size and define a network of squares over the surface of the central portion of the block the size of a die D, each with a small aperture 14 therein.

The lower flange 13 is generally circular, but is provided with a notch at 17 and flats at 18, 19 for orientation purposes.

The backside of the block is provided with apertured support ribs 20, 21 perpendicular to one another, each rib with projecting portions 22 extending to the plane of the bottom surface of the block.

TAPE PUNCH MACHINE

Figure 4:
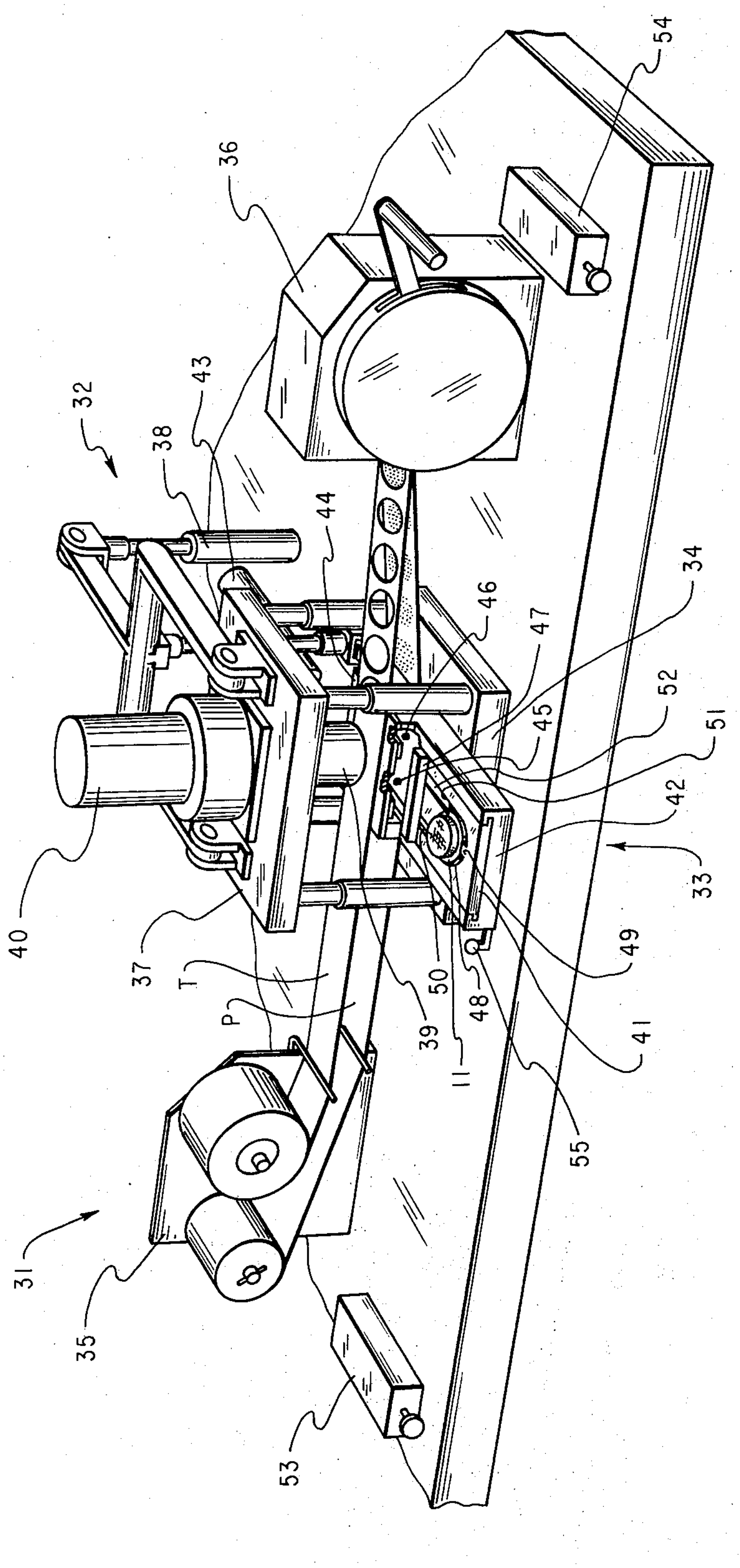
FIG. 4 is a perspective view partially cut away and partially in schematic of a tape punch machine for applying an adhesive to the raised central portion of the mounting block.

Prior to wafer placement, adhesive is secured to the raised central portion of the mounting block prior to wafer placement. Apparatus for accomplishing same is shown in FIG. 4. With reference to FIG. 4, apparatus for applying adhesive to the mounting block is shown as including a tape supply 31, a punch mechanism 32 for blanking out a piece of tape somewhat smaller than the raised central portion 12 of the mounting block 11 but larger than the wafer W, and for perforating the tape in registry with the holes 14 of the mounting block 11, and a mechanical stage 33 for aligning the mounting block 11 precisely relative to the punching mechanism 32 prior to punching. The tape supply 31, mechanical stage 33 and punching mechanism 32 are supported on a baseplate 34.

The tape supply is shown as including a tape feed mechanism 35 and take-up mechanism 36. An adhesive tape T having adhesive on both sides and with an upper or outer surface covering is fed beneath the punch mechanism 32 and over the mechanical stage 33. A plane tape P is fed beneath the mechanical stage 33 and over the baseplate 34.

The punch mechanism 32 includes an upper platen 37 which is vertically reciprocable upon actuation of an air cylinder 38. Disposed centrally of the upper platen is a punch including a circular member 39. Member 39 is provided with a cutting edge for blanking out a circular piece of adhesive tape T and ribs for depressing the adhesive into slots 15, 16. Member 39 is also apertured. A plurality of dies pass through these apertures for perforating the tape in registry with the holes 14 in the mounting block raised central portion 12. The punch dies are vertically reciprocable relative to the platen 37 upon actuation of an air cylinder 40. The circular member 39 need not be ribbed. The adhesive T could be rolled into the slots after the adhesive has been applied to the mounting block.

The mechanical stage 33 for precisely aligning the mounting block beneath the punching mechanism includes a platform 41 slidably held within a cradle 42. The platform 41 is reciprocable within the cradle upon actuation of an air cylinder 43.

At the rear of the cradle 42 a bridge 44 extends over the platform. A pair of stop pins 45, 46 project from the top surface of the cradle 42.

The platform 41 includes on its top surface a support plate 47, a circular recess 48 in which the mounting block 11 is placed, a tongue 49 which abuts against the larger flat 18 of the mounting block, two longitudinal slots 50, 51, one which extends to the smaller flat 19 of the mounting block when placed in circular recess and the other which extends to the notch 17 in the mounting block when placed in the circular recess and a latch spring 52 which extends from the support plate to the notch 17 of the mounting block 11 when placed in the circular recess.

A pair of safety switches 53, 54 are located at either end of the apparatus. As a safety precaution, both switches must be depressed at the same time to initiate operation.

In operation, the mounting block 11 to be covered with adhesive T is placed in the circular recess 48 on the platform 41 of the mechanical stage 33. In this position the larger flat 18 rests against the tongue 49 and the latch spring 52 rests in the notch 17 of the mounting block 11. The air cylinder 43 is actuated. The platform 41 slides within the cradle 42. The support plate 41 moves beneath the cradle bridge 44. The first stop pin 45 will come to rest against the smaller flat 19 of the mounting block while the second stop pin 46 lifts the latch spring 52 and comes to rest in the mounting block notch 17. In this position the mounting block 11 is now precisely aligned beneath the punching mechanism 32. It is assumed, at this point, that the adhesive tape T extends from the tape feed 35 to the tape take-up 36 between the punch mechanism 32 and the mechanical stage 33 and that the plane tape P extends likewise but beneath the mechanical stage 33. The air cylinder 38 is actuated causing the platen 37 to move downwardly. The cutting edge of member 39 blanks out a circular piece of adhesive tape T which comes to rest on the central portion 12 of block 11. The ribs depress the adhesive T into the slots 15, 16 in the surface of central portion 12. The air cylinder 40 is next actuated to punch holes through the circular piece in registry with the holes 14 in the raised portion 12. The raised portion of the mounting block is now covered with a perforated piece of adhesive, the top surface of the adhesive being covered.

The air cylinders, 40, 38, 43 deactuate to raise the dies, platen 37 and return the platform 41 and mounting block 11 to initial position. A block remover 55 which extends beneath aligned openings in the front portion of the cradle 42 and platform 41 is actuated to push the mounting block 11 out of the circular recess 48 in the platform 41. This complete coating of the top surface of the mounting block. The tape may now be advanced for the next mounting block. As the adhesive tape T is wrapped about the take-up reel, the underlying, exposed adhesive surface is covered with the plane tape P.

Figure 5:
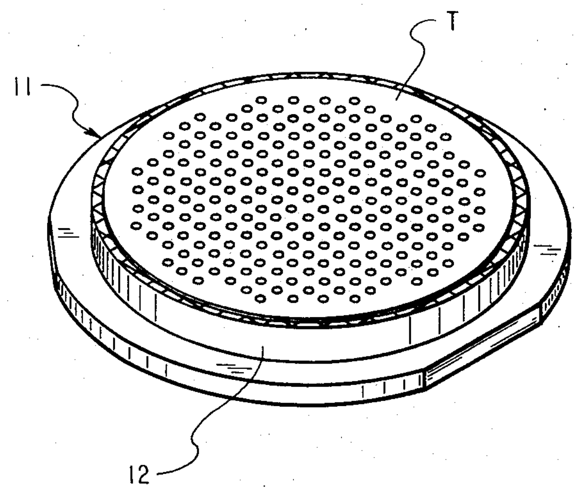
FIG. 5 is a perspective view of the top portion of the mounting block of FIGS. 2 and 3, after an adhesive has been applied to its raised central portion with the tape punch machine of FIG. 4.

The mounting block 11 with the perforated tape T on the raised central portion 12 is shown in FIG. 5.

WAFER MOUNTING APPARATUS

Figure 6:
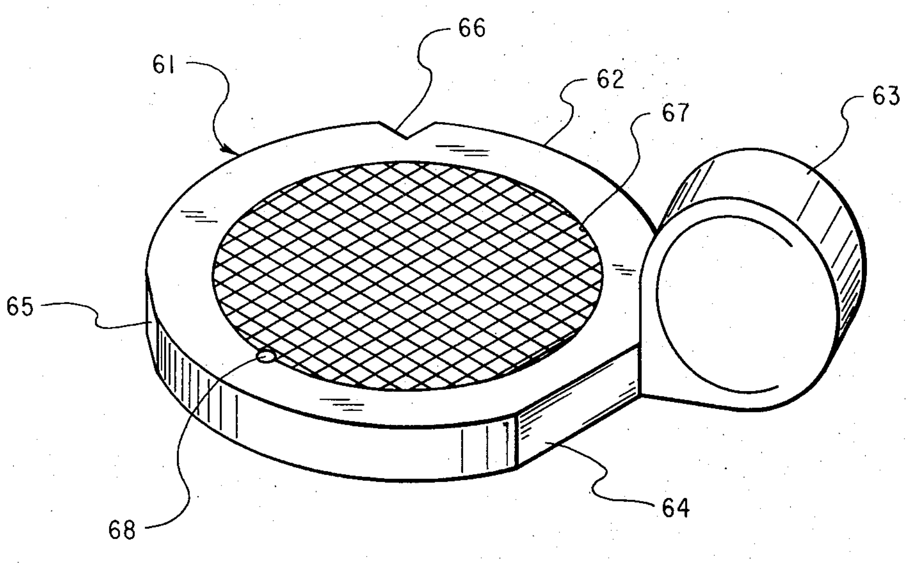
FIG. 6 is a perspective view of a wafer shovel for placement of wafers within the wafer mounting apparatus of FIG. 7; infra.
Figures 7, 8, 9:
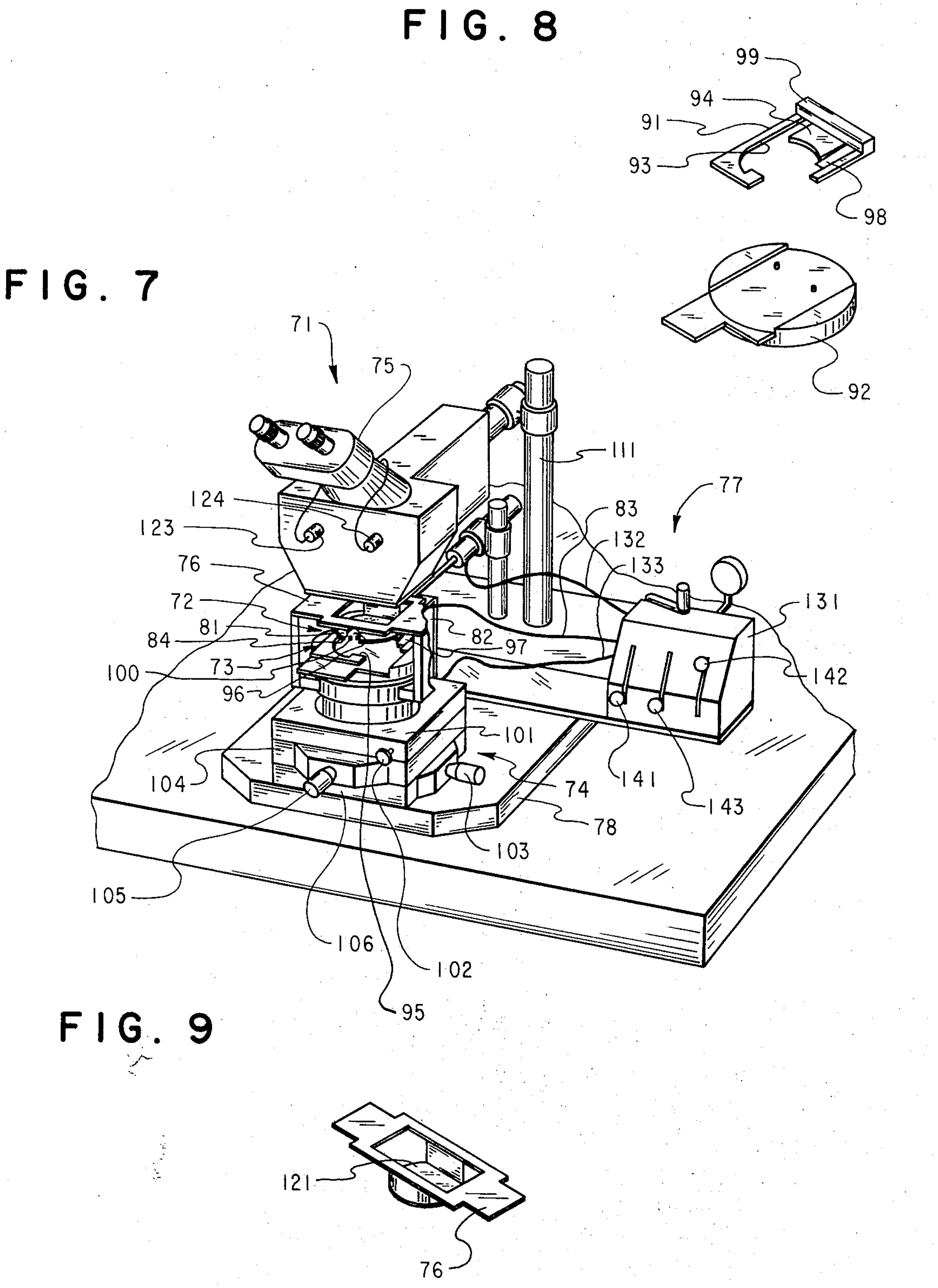
FIG. 7 is a perspective view of apparatus for mounting precisely the wafers of FIG. 1 on the raised central portion of the mounting block of FIGS. 2 and 3.
FIG. 8 is an exploded, cut away, perspective view of the placement mechanism for the wafer mounting apparatus of FIG. 7.
FIG. 9 is an exploded, cut away, perspective view of the alignment reticle for the wafer mounting apparatus of FIG. 7.

In the next stage of operation the wafer is to be placed in precise alignment on the mounting block. Referring to FIGS. 6 and 7 there is shown the apparatus required for accomplishing same. Referring first to FIG. 6 there is shown a wafer shovel 61 for placement of wafers W within the wafer mounting apparatus 71 of FIG. 7. The shovel 61 is shown as including a generally planar circular section 62 on which the wafer is placed, and a handle 63. The periphery of the circular section is provided with larger 64 and smaller 65 flats and a notch 66 corresponding in size, shape and position with the flats and notch on the mounting block. The top surface of the circular section is provided with a central recess 67 for reception of wafers and an alignment pin 68 for proper orientation of the wafer within the central recess 67.

Referring now to FIG. 7 the wafer mounting apparatus 71 is shown as including: a wafer holder 72; a placement mechanism 73 for successively placing the wafer shovel 61 and mounting block 11 on the wafer mounting apparatus and positioning beneath the wafer holder 72; a mechanical stage 74 for moving the wafer holder 72 relative to the placement mechanism 73 when the mounting block 11 is positioned beneath the wafer holder 72; alignment means including a split field microscope 75 and an alignment reticle 76 to permit an operator to achieve precise alignment between the wafer, when being held by the wafer holder 72, and the mounting block 11, when positioned on the placement mechanism 73 beneath the wafer holder; and, pneumatic means 77 connected to the wafer holder and placement mechanism, and including controls therefor, for successively raising the placement mechanism 73 to bring the wafer W on its shovel 61 in close proximity to the wafer holder 72, for sucking the wafer onto the wafer holder 72 and holding same by vacuum, for lowering the placement mechanism 73, for again raising the placement mechanism 73 after the mounting block 11 has been placed thereon and aligned with the wafer on the wafer holder, for releasing the wafer from the wafer holder 72, for sucking the wafer in closely against the adhesive surface T and, finally, for lowering the placement mechanism 73 after the wafer has been precisely mounted on the mounting block. The entire apparatus 71, exclusive of the pneumatic controls may be mounted on and within a base plate 78.

As best seen in FIG. 7 the wafer holder 72 includes a hollow, doughnut-shaped ring 81 dependent from a support bracket 82 extending from the mechanical stage 74. The interior of the ring is in communication with the pneumatic means 77 via a line 83. The lower surface of the ring is provided with small apertures (now shown). An apertured rubber gasket 84 is fitted against the lower surface of the ring 81 to minimize damage on wafers.

As best seen in FIGS. 7 and 9, the placement mechanism 73 comprises a platform 91 slidably held on a cradle 92. The platform includes a generally circular recess 93. A forward tongue 94 with a circular edge is adapted to abut against a curved portion of the wafer shovel 61 and the mounting block 11. A rear tongue 95 with a straight end is adapted to abut against the larger flat of the wafer shovel 61 and mounting block 11. Two longitudinal slots 96, 97 extend from the forward end of the platform 91 and are adapted to terminate at the circular recess portion 93 where the smaller flat and notch of the wafer shovel 61 and mounting block 11 will be positioned. A latch spring 98 which will initially rest in the notch on the wafer shovel and mounting block extends from a lateral support plate 99. The platform is slidably held within the cradle. Two stop pins 100, (not shown) which ride within the platform slots 96, 97 extend upwardly from the cradle stop surface.

The mechanical stage 74 includes a series of movable platforms resting on the base 78. The upper most platform 101 is rotatable by rotating the knob 102. Rotation of the knob 103 causes movement of the intermediate platform 104 and top most platform 101 in an X direction. Rotation of the knob 105 causes movement of the lowest platform 106, intermediate platform 104 and top most platform 101 in the Y direction. Since the wafer holder 72 is dependent from a bracket 82 mounted on the top most platform 101, the wafer holder 92 may be displaced angularly or in an X or Y direction.

The alignment means comprises a split field microscope 75 and an alignment reticle 76. The microscope 75 is held on a support rod 111 secured to the base 78. The reticle 76 is held beneath the microscope 75 and includes a glass plate 121 with fiducials thereon.

Light is provided from illumination sources 123, 124.

The alignment reticle 76 is first aligned to the mounting block, and then fixed in that position. Thereafter, the microscope 75 permits an operator to view both an image of the top surface of the wafer W and the alignment reticle 76. Upon adjustment of the mechanical stage 73, the image of the wafer W is brought into alignment with the image of the reticle 76, by superimposing their respective fiducials.

The pneumatic means 77 comprises a pressure source (not shown) and an evacuation means (not shown) connected through pneumatic control means 131 by means of lines 83, 132, 133 to the wafer holder ring 81, to the placement mechanism 73 and to a piston on which the placement mechanism 73 rests.

Operation of the wafer mounting apparatus is as follows. Initially, the wafer shovel 61 bearing a wafer W in its central recess 67 is positioned on the placement mechanism 73 beneath the wafer holder 72. If required and desired, some rough alignment of the wafer holder 72 can be accomplished at this point by manipulation of the mechanical stage 74. With the wafer shovel 61 positioned beneath the wafer holder 72, the first control lever 141 on the pneumatic control means 131 is actuated to apply pressure to the piston beneath the placement mechanism 73 lifting the placement mechanism 73 into close proximity to the wafer holder 72. The third control lever 142 on the pneumatic control means 131 is actuated to create a vacuum within the wafer holder ring 81 and sucking the wafer W off of the shovel 61 and onto the wafer holder 72. The first control lever 141 is deactuated to lower the placement mechanism 73 and the wafer shovel 61 is removed from the placement mechanism 73.

Alignment is now accomplished by viewing through microscope to align fiducials on wafer W with those on reticle 76. Following this the protective covering is peeled from the adhesive surface T on the mounting block 11 and the mounting block 11 is positioned on the placement mechanism 73 beneath the wafer holder 72. The first control lever 141 on the pneumatic control means 131 is actuated to bring the adhesive surface T of the mounting block 11 in contact with the bottom surface of the wafer W on the wafer holder 72. The second control lever 143 on the pneumatic control means 131 is actuated creating a vacuum under the mounting block 11 and thereby putting the wafer W firmly onto the adhesive surface T of the mounting block raised portion 12. The second 143 and first 141 control levers on the pneumatic control means 131 are now deactuated to remove the vacuum and to lower the placement mechanism 73. The mounting block 11 may now be removed from the placement mechanism with the wafer W snuggly and precisely aligned on its adhesive surface T. The wafer W is now ready for subsequent processing, i.e., testing and dicing and chip selection.

DICING

In accordance with further teachings of the present invention the semiconductive wafer may now be subdivided into suitable sized dice D in one of two possible ways. In the first possible way, the wafer is subdivided using the so-called slurry saw technique. However, a protective polymer coating is applied to the surface of the wafer prior to the dicing operation. In the second possible way a blade with a coated edge is employed. In this latter instance the protective coating on the wafer may be omitted.

Figure 10:
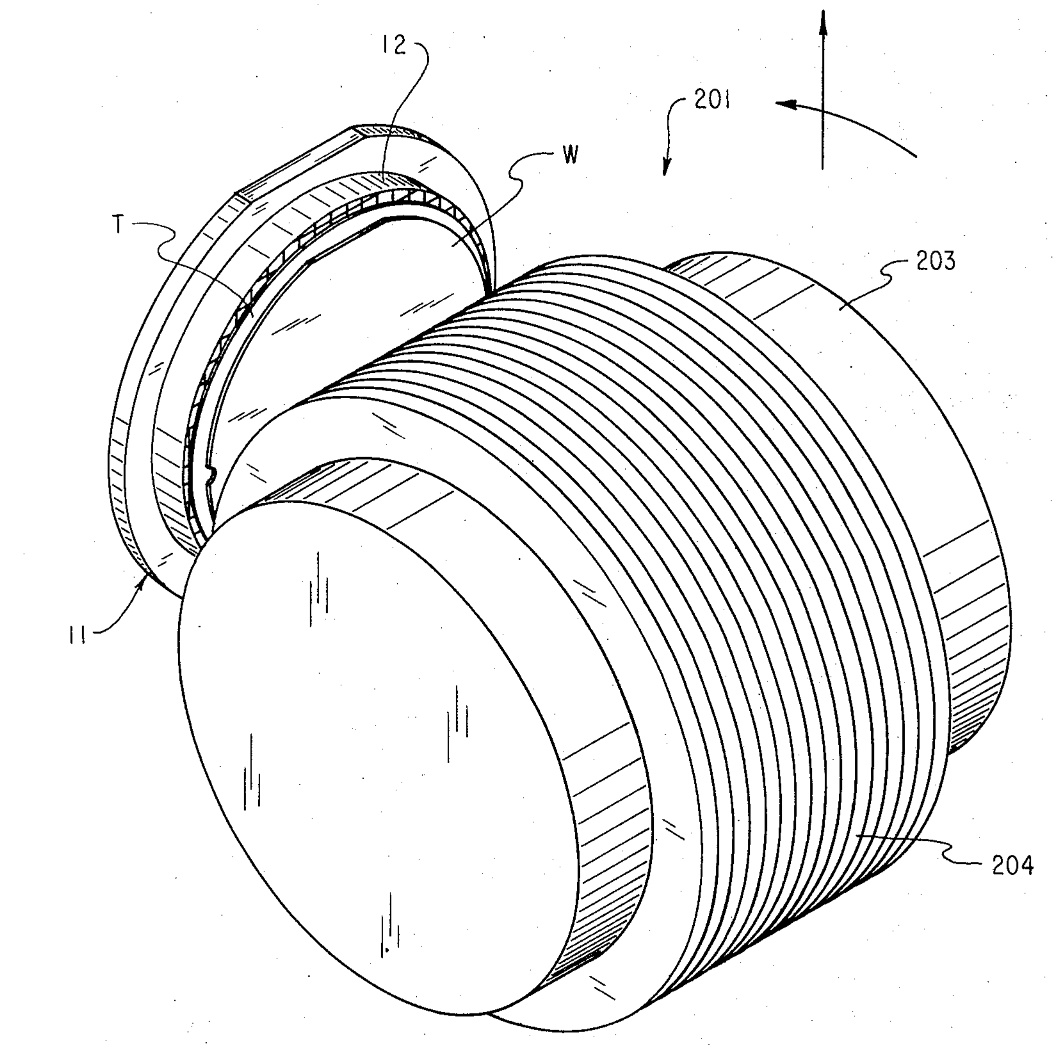
FIG. 10 is a perspective view showing the mounting block with a wafer mounted thereon and a cutting arbor for dicing same.

Reference will now be had to FIG. 10 of the drawing. The wafer W is shown bonded to the raised central portion 12 of the mounting block 11 by means of the adhesive layer T. Assuming that the wafer W is to be diced using the slurry saw technique, then the top surface of the wafer is covered with a protective polymeric coating C (See FIG. 11A) prior to the dicing operation. Normally the coating C is applied prior to mounting wafer W on block 11. Examples of such coatings are polyamides, polyacrylates and derivatives, polyvinyl alcohol and derivatives, polyphenylene oxide, polyvinylidene chloride and derivatives, polycarbonate and derivatives, and polysulfone and any transparent thermoplastic organic coatings. Particularly advantageous coatings found are a polyamide sold by Dynamit Nobel of America, Inc. under its trademark Trigamid-T, a polyamide sold by E. I. Dupont de Nemours & Co., (Inc.) under its trademark Elvamide and a polyvinyl alcohol also sold by Dupont under its trademark Elvanol. The coating C is applied to the wafer by a spin process and using a diluted solution on the order of 7–10 percent. The last mentioned polyamide coatings leave no residue but a clean surface. These coatings are transparent so they do not hinder the alignment step of the wafer on the mounting block 11 in the dicing apparatus placement mechanism. Trigamid-T can be readily removed in dimethylformamide (DMF). The DMF does not affect the adhesive used to hold the wafer to the mounting block.

It is found that the coating reduces chipping along the kerf which results in higher yield and better quality. The coating eliminates stray erosion of the device surface and joints.

Referring back to FIG. 10 and 11A, after the wafer has been coated with a protective layer, the mounting block 11 is positioned within a placement mechanism in a dicing apparatus 201 similar to the placement mechanism found in the wafer mounting apparatus shown in the previous FIGS.

Disposed over the mounting block is a slurry nozzle 202 out of which there continually emanates a flow of liquid abrasive or slurry. Typically, this slurry is a suspension of silicon carbide particles in water.

Mounted on a rotatable arbor are a plurality of spaced cutting discs 204. Suitable material for the cutting discs is stainless steel.

Means (not shown) are provided to impart a high rotational speed to the arbor 203 and in turn to the cutting discs 204. In operation, the discs 204 are brought up to desired speed and the slurry flow from the nozzle 202 is initiated.

Figure 11A:
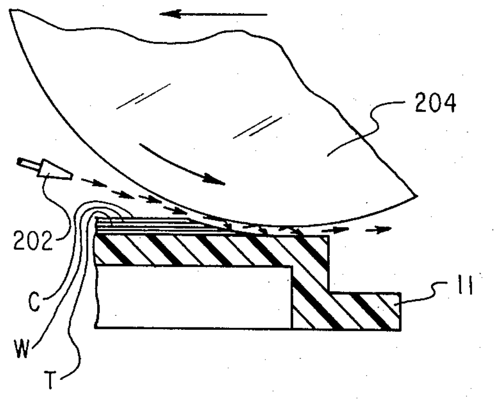
FIG. 11A is a schematic side view showing the cutting action using the slurry saw technique.

As best seen in FIG. 11A, when the discs 204 are rotating at the specified cutting speed, a downward acceleration is imparted to the abrasive particles in the slurry as they impart the edge of the discs. The result is a bombardment action which causes erosion of the wafer material directly beneath the edges of the rotating discs.

To produce the diced effect the wafer is first cut in one direction along rows 15 and then rotated 90° and cut again along columns 16.

Figure 13:
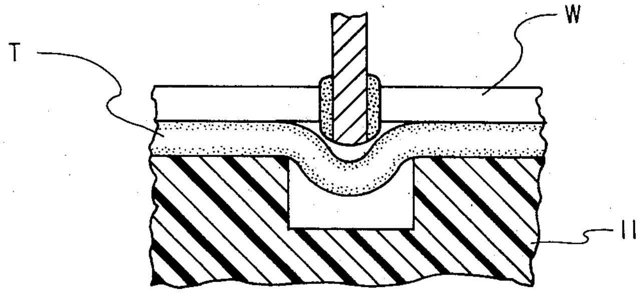
FIG. 13 is an enlarged cross sectional view of the mounting block, adhesive wafer and cutting disc during the dicing operation; and, FIG. 14 is an enlarged cross sectional view of the mounting block, adhesive and wafer after the dicing operation.
Figure 14:
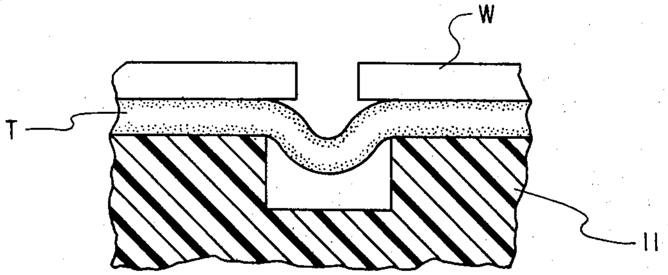

In the cutting position the discs 204 are aligned with the rows 15 and columns 16. Accordingly, as the cutting action advances along a given row or column, the discs never come in contact with the surface of the mounting block 11 or the adhesive T (See FIG. 13). Nor are the discs eroded by abrasive particles caught between the block and the edge of the discs 204. After dicing, the chips still remain adhered to the mounting block in their initial position.

Instead of using the slurry saw technique, a coated blade may be employed. In this instance the protective coating may be omitted without any deleterious effect to the active device on the semiconductive wafer.

Figure 11B:
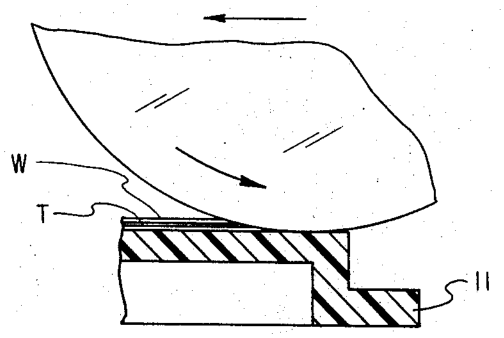
FIG. 11B is a schematic side view showing the cutting action using a blade with a coated edge.
Figure 12:
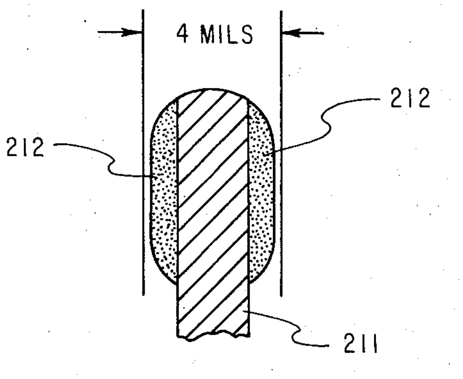
FIG. 12 is a cross sectional view of the coated blade of FIG. 11.

Previous attempts to employ diamond cutting saws have not met with success. In accordance with the invention and with reference to FIGS. 11B and 12 of the drawing, a cutting disc 211 of stainless steel 2 mils thick is employed. The peripheral edge, typically 4 mils thick includes diamond particles 212 of 8–12 micron particle size bonded thereto by plating. Larger particle size than 12 microns results in greater chipping, while with smaller particle size than 8 microns, there is difficulty in keeping the particles on the disc and blade lifetime is reduced. Additionally, man-made diamonds are preferred to natural ones. Man-made diamond particles are more symmetrical and lead to less chipping than the more jagged natural occurring diamond particles.

In accordance with another teaching of the present invention, and again with reference to FIGS. 11B and 12 of the drawing, the saw may comprise a cutting disc 211 of stainless steel 2 mils thick with a thin coating 212 of titanium carbide at the cutting surface from 1,000 A units to 1.0 mil thick. The titanium carbide coating is applied preferably by r. f. sputtering. Apparatus for applying the coating is described in a copending application of K. B. Scow et al. entitled "R. F. Sputter Apparatus," Ser. No. 77105, filed Oct. 77,105, 1970 and assigned to the same assignee as the present invention.

The titanium carbide coated blade is cheaper, forms an intimate bond with the disc and yields a longer life blade.

Once the wafer has been diced, the diced surfaces are cleaned in DMF. After testing has been completed, the acceptable dice are removed from the adhesive surface on the mounting block. The remaining defective dice and adhesive tape T may be peeled from the central portion 12 and the mounting block 11 reused.

While the invention has been particularly described and shown with reference to the preferred embodiments thereof, it will be understood by those skilled in the art that various changes in form and detail and omissions may be made therein without departing from the spirit and scope of the invention.

What is claimed is:

1. A mounting block for use in the testing and dicing of a semiconductive wafer having a plurality of devices formed thereon comprising:

a body of plastic material having a raised central portion and a lower flange;

said central portion having a plurality of apertures such corresponding to and to be in registry with a respective device of said semiconductive wafer;

said central portion having a top surface slotted along spaced columns and rows, the rows and columns being perpendicular to one another, said columns and rows defining a network of squares over the top surface, each with an aperture therein; and, said lower flange being generally circular and having a notch and two flats at its periphery for orientation purposes.

2. The invention defined by claim 1 including an adhesive medium applied to the top surface for bonding the wafer thereto.

* * * * *